Patented Sept. 21, 1948

2,449,537

UNITED STATES PATENT OFFICE 2,449,537

RECOVERY OF ACIDIC GASES

Arthur W. Hixson, Leonia, N. J., and Ralph Miller, New York, N. Y., assignors to The Chemical Foundation, Incorporated, a membership corporation of New York No Drawing. Application July 12, 1946, Serial No. 683,154

12 Claims. (Cl. 23—178)

1

This invention relates to the recovery of acidic gases, more particularly with the treatment of gas mixtures which contain a relatively low concentration of acidic gases to remove and recover such gases in concentration form. This application is a continuation in part of prior application, Serial No. 531,936, filed April 20, 1944, now Patent 2,405,747, issued August 13, 1946.

As is known, the usual method of removing and recovering acidic gases comprises absorbing the gas in a liquid which has a preferential affinity for the gas under the particular conditions of the absorption operation but which readily releases the gas in the regenerative step. Such a method is not particularly efficient when the gas is a strong acid and when it occurs in small concentration in the gas mixture. A classic example of this problem is found in the recovery of sulphur dioxide from flue gas. To date, no truly economical method has been advanced which solves this problem. A particular disadvantage of prior art methods was the fact that substantial oxidation of the sulphur dioxide took place in the absorption step, involving consequent loss of $SO_2$ and consumption of reagents to eliminate the sulphates thus formed.

It has been found that gas mixtures of the type described, i. e., those containing low concentrations of acidic gases may be economically treated by invoking a novel method of approach. This method, for the sake of a term, may be defined as a cyclic volatile base system and, as will be seen, involves a closed cycle into which, except for mechanical losses, only sulphur dioxide is introduced and withdrawn. The absorption and regeneration system utilizes essentially a volatile base, an acidic constituent and a salt that may be decomposed to regenerate the said volatile base and acidic constituent. Among other advantages, the present invention is characterized by the fact that the absorption may be carried out under such circumstances as to greatly minimize the oxidation of sulphur dioxide.

With respect to the recovery of sulphur dioxide, as pointed out in the prior application, there are two materials which abundantly satisfy the requirements of the cyclic volatile base system. These are ammonium fluoride and ammonium sulfate. When these salts are heated they are decomposed into a volatile base, namely, ammonia, and an acid salt, namely, ammonium acid fluoride and ammonium bisulphate respectively. When the liberated ammonia is dissolved in water and contacted with a sulphur dioxide-containing gas, such as flue gas, the sulphur di-

2 oxide reacts with the ammonium hydroxide to form ammonium bisulphite. If the bisulphite solution is treated with one of the acid salts at the proper temperature and under proper conditions, sulphur dioxide is evolved and the original salt, i. e., ammonium fluoride or ammonium sulphate is reformed. The process then consists of a closed cycle into which, disregarding incidental mechanical losses, only sulphur dioxide is introduced and from which only sulphur dioxide is withdrawn.

Ammonia is the preferred material for the volatile base. This presents several important advantages among which is its moderate cost, relatively high volatility and the fact that it permits high concentrations of sulphur dioxide to be taken up in water as ammonium bisulphite, thus commensurately diminishing the volume of absorbing liquid circulated through the absorber with corresponding thermal economics in the subsequent stages.

Ammonium fluoride is one of the effective agents which may be employed in the cyclic volatile base system. In using this material in the novel sulphur dioxide cycle the sequence of operations will have been appreciated. When an ammonium bisulphite solution is added to ammonium bifluoride and the solution is heated, sulphur dioxide is evolved and ammonium fluoride is formed in solution. If the ammonium fluoride solution is evaporated some ammonia is evolved. The stable compound of ammonia and hydrofluoric acid in the liquid state is ammonium bifluoride. This has a boiling point 240° C. and a melting point of 125° C. Thus, in heating ammonium fluoride to a temperature above 125° C. and below 240° C. it will be decomposed into ammonia and ammonium bifluoride which are directly reemployed in the described cycle. It will thus be seen that the use of ammonium fluoride in the cycle presents the advantages of relatively low temperature operation in the thermal decomposition step.

However, the use of ammonium fluoride does present some disadvantages. In the thermal decomposition not an inconsiderable quantity of hydrogen fluoride tends to be evolved. This is due to the fact that liquid ammonium acid fluoride has an appreciable vapor pressure; this is apparent from the fact that at 240° C. its vapor pressure is equal to atmospheric pressure. It will be observed also that only about a half of the ammonia in the system is usefully employed in the absorption of sulphur dioxide. However, it has been found that by the use of potassium fluoride the vaporization of hydrogen fluoride can be substantially decreased if not completely eliminated and therefore practically all of the ammonia can be used in the entire cycle.

The advantages of employing potassium fluoride in conjunction with an acidic gas and ammonia may be appreciated by considering the following method of carrying out the process: A solution of ammonium bisulphite is first formed by scrubbing the flue gases with an ammonical solution. When the concentration of the ammonium acid sulphite is sufficiently high it is passed from the scrubber unit to a tank in which it is treated with potassium acid fluoride to evolve sulphur dioxide according to the following equation:

(1) $NH_4HSO_3 + KHF_2 = NH_4F + KF + H_2O + SO_2$

This reaction may be accelerated by maintaining the solutions at about the boiling point. Since the sulphur dioxide is insoluble in the hot solution it is readily evolved.

The sulphur dioxide-denuded solution is then evaporated in any suitable manner and the mixed salts are heated to evolve ammonia and potassium acid fluoride according to the following equation:

(2) $\quad KF + NH_4F = KHF_2 + NH_3$

This thermal decomposition is readily effected at temperatures of the order of 200° C. or somewhat higher.

The ammonia which is evolved is recycled to the sulphur dioxide absorption step and the regenerated potassium acid fluoride is returned to the sulphur dioxide evolution step.

As will be understood by those skilled in the art, the reaction of ammonium fluoride and potassium fluoride to produce ammonia and potassium fluoride may be effected in a number of ways. Preferably, the heating is carried out by using superheated steam in direct contact with the reactants. This presents a number of advantages, for example, the temperature control is simplified; the recovery of ammonia is facilitated, due to the absence of non-condensable gases, and the material of construction problem is simplified. The materials used in the construction thus need only possess satisfactory resistance to the action of potassium acid fluoride and need not have good heat transfer properties; thus, carbon lined equipment is eminently satisfactory.

The foregoing methods of operation using either ammonium fluoride or potassium fluoride and ammonium fluoride might suggest that the decomposition reaction must go to completion. This is not the case. It was pointed out above that if an ammonium fluoride solution is evaporated some ammonia is evolved. The boiling liquid no longer contains a one to one ratio of $NH_3$ to fluoride ion. Instead the ratio is changed and the solution is acidic. As the evaporation proceeds more and more water and ammonia are vaporized and simultaneously the acidity and the boiling point of the solution increases. At some optimum point, the evaporation operation may be halted. The ammonia which was evolved is returned to the gas absorption step of the process. The acidic solution formed as a result of the evaporation operation is used to treat the ammonium bisulfite solution formed in the gas absorption step. It is not essential to completely remove all the water associated with the ammonium acid fluoride or to decompose all the ammonium fluoride. In this method of operation the following sequence of steps take place:

An ammonia containing solution is contacted with a gas stream containing an acidic gas such as sulfur dioxide. This causes a salt solution of the acidic gas and ammonia to be formed. In this instance the solution is an ammonium bisulfite solution. The ammonium bisulfite solution is then treated with a hot acid solution which can be represented as a solution of ammonium fluoride plus ammonium acid fluoride. This causes sulfur dioxide to be evolved. A small amount of water vapor may be mixed with the sulfur dioxide but it is free from non-condensable gases. The solution from which the sulfur dioxide is liberated is converted to substantially a solution of ammonium fluoride. This solution is now evaporated. As the evaporation proceeds both water and ammonia are evolved and the boiling point of the solution rises. The evaporation is continued until ammonia is no longer evolved. The point at which ammonia is no longer evolved is determined by the equipment employed in any given installation and the conditions under which it is operated. The ammonia vaporized in the evaporation step is recycled to the absorption step of the process. The acidic solution formed in the evaporation operation is returned to the sulfur dioxide liberation step.

Just as is the case when ammonium fluoride alone is used, ammonia is evolved when a solution composed of potassium fluoride and ammonium fluoride is evaporated. In the same way the acidity of the solution increases as the amount of ammonia vaporized increases. As the concentration of potassium and ammonium fluoride and acid fluoride increases, the boiling point of the solution increases. It is not necessary that all the water be vaporized or all the ammonia be vaporized for the process to be operable. The evaporation may be halted while the salts are still in solution at the temperature prevailing in the evaporator. Under ordinary circumstances the evaporation is carried out at atmospheric pressure although it is feasible to evaporate the solution under vacuum or pressure. Theoretically, it is advantageous to carry out the evaporation under pressure because this raises the temperature at which the evaporation proceeds. The higher the temperature the greater is the vaporization of ammonia per pound of water evaporated. Whether or not it is economically justifiable to carry out the evaporation under pressure has to be determined in each individual case. Similarly, in deciding on the possible advantage of carrying out the evaporation under vacuum, it is necessary to analyze the conditions prevailing in any given location to determine whether evaporation under vacuum, although theoretically unsound, is still justified. Such a condition might exist where a supply of low pressure steam was available at little or no cost. An example might be the exhaust from a simple steam engine.

The concentrated fluoride solution resulting from the evaporation step is acidic because ammonia has been removed from it along with some water. The ammonia which is vaporized is used to absorb the acidic gas; the acidic solution is used to liberate the acidic gas from the ammonium salt solution.

Another method of recovering acidic gases in concentrated form employing the same principle of a volatile base makes use of sodium fluoride as a process aid. As in all the methods described above, ammonia is used to contact the acidic gas stream to form a salt solution of the acidic gas and the base. The solution from the absorption operation is treated with solid sodium acid fluoride. The reaction, assuming $SO_2$ is the acidic gas, which takes place may be written:

(3) $NH_4HSO_3 + NaHF_2(solid) =$
$NaF(solid) + NH_4F + SO_2 + H_2O$

The sodium acid fluoride reacts with the sulfite or preferably bisulfite solution to liberate sulfur dioxide and to form an ammonium fluoride solution. A small amount of sodium fluoride dissolves but due to its limited solubility in water, the amount which does dissolve is slight. The sulfur dioxide which is formed is only slightly soluble and consequently is evolved as a concentrated gas. The evolution of sulfur dioxide is hastened by heating the solution. This also increases the rate at which the hydrogen fluoride associated with the sodium fluoride goes into solution. The resulting solution is substantially an ammonium fluoride solution.

This solution is now evaporated in the presence of solid sodium fluoride. As the concentration proceeds, ammonia is vaporized along with the water. The solution becomes acidic. However, the acidity of the solution does not continue to build up. When enough ammonia has vaporized so that the equivalent of about .5% of hydrogen fluoride is present based on the water content of the solution, hydrogen fluoride combines with the solid sodium fluoride present to form solid sodium acid fluoride. In this way the solution is stripped of excess hydrogen fluoride and ammonia can continue to be evolved. A similar result can be obtained by vaporizing water and ammonia from an ammonium fluoride solution, removing the acidic ammonium fluoride solution from the evaporator and contacting it with solid sodium fluoride. The sodium fluoride will remove hydrogen fluoride from the solution. The solution, now less acidic than before, is returned to the evaporation step of the process and the vaporization of ammonia and water is continued.

When this process is carried out on a large scale each step is carried out continuously. The absorption of an acidic gas such as sulphur dioxide by ammonia is a well-known operation. The absorbent solution is carculated through the gas contacting equipment continuously. The solution leaves the gas contacting equipment as close to equilibrium with the incoming gas stream as possible. Some of the solution may be recycled after being fortified with additional ammonia and if necessary, water is added to the absorbing liquid. The remainder of the ammonium salt solution is contacted continuously with an acidic reagent either liquid, solid or in solution, and preferably at about the boiling point of the solution. This causes sulfur dioxide to be evolved continuously. The sulfur dioxide denuded solution is continuously withdrawn from the sulfur dioxide liberation equipment. It flows continuously to an evaporator in which water and ammonia are continuously vaporized and in which an acidic solution is formed. The ammonia is recycled to the absorption step of the process and the acidic solution recycled to the sulphur dioxide liberation step of the process.

As is known solutions composed of bisulfite such as ammonium bisulfite are less readily oxidized than solutions composed of normal or monosulfites. Moreover, solutions which contain both mon and bisulfites are oxidized more readily than monosulfite solutions. This is the condition which obtains in the usual absorber.

The present process may be operated to minimize such oxidation. In this operation a solution of ammonium acid sulphite is circulated through the tower. Ammonia is introduced at the proper rate into the gas stream prior to the gas stream reaching the absorber. This insures intimate dispersion of the ammonia through the gas stream and insures intimate contact with the sulphur dioxide in such stream. The ammonia is fed in so as to provide a mol of ammonia for each mol of sulphur dioxide in the stream. As the stream is contacted with water ammonium acid sulphite is formed and is dissolved. By this method of operation not only is the oxidation of the sulphur dioxide held to a minimum but also the equipment requirements for the absorption step is greatly simplified. This is apparent when it is realized that as soon as the temperature of the gas stream is lowered sufficiently solid ammonium acid sulphite will form due to the reaction between sulphur dioxide, ammonia and water vapor. Thus, the function of the absorber is essentially the removal and dissolution of this compound from the gas stream.

It will now be seen that the described process invokes a novel concept in the removal and recovery of acidic gases the utilization of which insures new results. As will have been seen, the described cyclic volatile base method, disregarding mechanical losses, presents a truly complete regenerative system since only sulphur dioxide is introduced and withdrawn. The method permits the effective treatment of gases which contain only a small percentage of sulphur dioxide and insures high recoveries because of the minimization of oxidation of the sulphur dioxide.

While preferred embodiments of the invention have been described it is to be understood that these are given didactically to illustrate and explain the underlying principles involved and not as limiting the scope of the invention to these particular illustrative embodiments.

We claim:

1. A method of recovering sulfur dioxide from sulfur dioxide-containing gases which comprises, contacting the gas with ammonia and water to thereby form ammonium bisulfite, reacting the ammonium bisulfite with an acid fluoride under conditions regulated to evolve sulfur dioxide and form a solution containing ammonium fluoride, recovering the evolved sulfur dioxide, thermally decomposing the ammonium fluoride solution to separately recover ammonia and an acid fluoride therefrom and recycling such recovered ammonia and acid fluoride to preceding steps in the process.

2. A process according to claim 1 in which the acid fluoride is an alkali metal fluoride.

3. A process according to claim 1 in which the acid fluoride is ammonium acid fluoride.

4. A process according to claim 1 in which the acid fluoride is potassium acid fluoride.

5. A process according to claim 1 in which the acid fluoride is sodium acid fluoride.

6. In a process for recovering sulfur dioxide from sulfur dioxide-containing gases the steps of adding a solution containing an acid fluoride to a solution of ammonium bisulfite under conditions regulated to evolve sulfur dioxide and form a solution containing ammonium fluoride, recovering the evolved sulfur dioxide, evaporating the said solution containing ammonium fluoride whereby the acid fluoride solution is reformed and water and ammonia are vaporized, recovering the vaporized ammonia, and contacting sulfur dioxide-containing gas with the said recovered ammonia in the presence of water to form an additional quantity of ammonium bisulfite solution.

7. A process according to claim 6 in which the acid fluoride is an alkali metal fluoride.

8. A process according to claim 6 in which the acid fluoride is ammonium acid fluoride.

9. A process according to claim 6 in which the acid fluoride is potassium acid fluoride.

10. In a process for recovering sulfur dioxide from sulfur dioxide-containing gases the steps of adding solid sodium acid fluoride to a solution of ammonium bisulfite under conditions regulated to evolve sulfur dioxide and form solid sodium fluoride and a solution containing ammonium fluoride, recovering the evolved sulfur dioxide, evaporating the said solution containing ammonium fluoride in the presence of solid sodium fluoride whereby solid sodium acid fluoride is reformed and water and ammonia are vaporized, recovering the vaporized ammonia and contacting the sulfur dioxide-containing gas with the said recovered ammonia in the presence of water to form an additional quantity of ammonium bisulfite solution.

11. In a process for recovering sulfur dioxide from sulfur dioxide-containing gases the steps of adding solid sodium acid fluoride to a solution of ammonium bisulfite under conditions regulated to evolve sulfur dioxide and form solid sodium fluoride and a solution containing ammonium fluoride, recovering the evolved sulfur dioxide, separating the solid sodium fluoride from the solution containing the said ammonium fluoride, partially evaporating the said solution to vaporize water and ammonia and form a solution containing ammonium fluoride, recovering the vaporized ammonia, contacting the said ammonia with sulfur dioxide-containing gas in the presence of water to form an additional quantity of an ammonium bisulfite solution, contacting the solution containing the acid fluoride with solid sodium fluoride to reform the solid sodium acid fluoride and a fluoride solution of diminished acidity, separating the solid sodium acid fluoride from the fluoride solution and returning the said solution to the evaporation operation.

12. A method of recovering acidic gases from acidic gas-containing mixtures which comprises, contacting the gas stream with ammonia and water under conditions regulated to form an acid salt of ammonia and such acidic gas; reacting such acid salt with an acid fluoride under conditions regulated to evolve the said acidic gas and form ammonium fluoride; recovering the evolved acidic gas and treating the ammonium fluoride to separately recover ammonia and the acid fluoride therefrom and recycling the recovered ammonia and acid fluoride to preceding steps in the process.

ARTHUR W. HIXSON.
RALPH MILLER.